US012232008B2

(12) United States Patent
Raucher et al.

(10) Patent No.: US 12,232,008 B2
(45) Date of Patent: Feb. 18, 2025

(54) PRIORITIZING USER DEVICES IN EMERGENCY SITUATIONS

(71) Applicant: RapidDeploy, Inc., Austin, TX (US)

(72) Inventors: Steven Raucher, Austin, TX (US); Chad Alan Richey, Longview, TX (US)

(73) Assignee: RapidDeploy, Inc., Austin, TX (US)

( * ) Notice: Subject to any disclaimer, the term of this patent is extended or adjusted under 35 U.S.C. 154(b) by 0 days.

(21) Appl. No.: 17/878,708

(22) Filed: Aug. 1, 2022

(65) Prior Publication Data

US 2023/0030719 A1 Feb. 2, 2023

Related U.S. Application Data

(60) Provisional application No. 63/227,591, filed on Jul. 30, 2021.

(51) Int. Cl.
*H04W 4/90* (2018.01)
*H04W 4/021* (2018.01)
*H04W 64/00* (2009.01)
*H04W 72/566* (2023.01)

(52) U.S. Cl.
CPC ............ *H04W 4/90* (2018.02); *H04W 4/021* (2013.01); *H04W 64/003* (2013.01); *H04W 72/566* (2023.01)

(58) Field of Classification Search
CPC ..... H04W 4/90; H04W 4/021; H04W 64/003; H04W 72/1247; H04W 76/50; G08B 25/016; H04M 11/04; H04M 2242/04
USPC ......................................................... 455/404
See application file for complete search history.

(56) References Cited

U.S. PATENT DOCUMENTS

| | | | |
|---|---|---|---|
| 6,397,054 B1 * | 5/2002 | Hoirup | H04B 7/18567 455/450 |
| 8,634,799 B1 * | 1/2014 | Economy | H04W 48/18 455/420 |
| 9,913,121 B2 * | 3/2018 | Johnson | G08B 27/001 |
| 10,257,740 B2 * | 4/2019 | McDonald | H04W 76/50 |
| 10,356,565 B2 * | 7/2019 | Patel | H04W 4/10 |

(Continued)

OTHER PUBLICATIONS

International Search Report and Written Opinion issued in PCT/US22/39058 on Dec. 19, 2022; 10 pages.

*Primary Examiner* — Charles N Appiah
*Assistant Examiner* — Frank E Donado
(74) *Attorney, Agent, or Firm* — Akona IP PC

(57) ABSTRACT

As part of an emergency response, a region in which communications may be affected by the emergency may be identified and used to prioritize communication by responders to the emergency. When an emergency is identified with a location, a priority communication region may be determined along with a set of identifiers corresponding to devices operated by emergency responders. Such responders may typically receive normal priority in the communications network. When the emergency is active, the location of responders' devices is monitored and when the devices are within the priority communication region the devices may be assigned a higher priority level of service in the communications network. When these devices leave the priority communication region or the emergency ends, the priority of the devices may be returned to a normal priority level for the devices.

20 Claims, 18 Drawing Sheets

(56) References Cited

U.S. PATENT DOCUMENTS

| | | | |
|---|---|---|---|
| 2003/0157923 A1* | 8/2003 | Tani | H04M 11/04 |
| | | | 455/445 |
| 2009/0054029 A1* | 2/2009 | Hogberg | H04W 72/10 |
| | | | 455/404.2 |
| 2012/0039451 A1* | 2/2012 | Shaffer | H04M 3/523 |
| | | | 379/142.1 |
| 2014/0099911 A1 | 4/2014 | Smith | |
| 2017/0318445 A1* | 11/2017 | Kodaypak | H04W 4/90 |
| 2018/0184236 A1* | 6/2018 | Faraone | H04W 4/027 |
| 2019/0090137 A1* | 3/2019 | Cutcher | H04W 4/10 |
| 2019/0261145 A1 | 8/2019 | South et al. | |
| 2020/0413238 A1* | 12/2020 | Bohlander | H04W 76/14 |

* cited by examiner

PRIORITIZING USER DEVICES IN EMERGENCY SITUATIONS

CROSS REFERENCE TO RELATED APPLICATION

This application claims the benefit of U.S. Provisional Patent Application No. 63/227,591, filed Jul. 30, 2021, the contents of which is hereby incorporated by reference in its entirety.

BACKGROUND

Emergency responders, such as police officers, fire fighters, and EMS providers, rely on mobile devices, such as mobile phones and tablets, to perform their duties. Emergency responders use their mobile devices to communicate with emergency dispatchers and coordinate with each other. Emergency responders also receive information relevant to responding to an emergency on mobile devices. For example, mobile devices may assist them with routing information (e.g., the location of an emergency, or directions to the location), location information (e.g., building type, building plans), and incident information (e.g., incident information collected by dispatch, health information, criminal background, etc.).

Mobile devices used by emergency responders may communicate (e.g., call, send data, and receive data) using communications infrastructure shared with non-emergency devices, such as cellular networks. In certain situations, such as large-scale events, natural disasters, or in remote areas, communications bandwidth may be limited. To ensure that emergency responders can communicate and receive data, communications networks, such as a cellular network, may have the capacity to prioritize certain traffic, such that prioritized traffic receives communications priority over non-prioritized traffic. An administrator at a communications network may select some set of users (e.g., a type of user, or users in a geographic area) and assign priority to these users.

Particularly in the context of emergency events, a manual process of assigning priority may result in a delay between the start of an event and when emergency responders receive priority. During this delay, emergency responders may have slow or no network connection, which can impair the initial emergency response. Furthermore, the manual process may reduce the usage of the priority status, impairing responses to smaller response situations and preventing effective use of the priority capacity. As a result, the cellular network may only provide priority for current, major events, with reduced connectivity for emergency responders in smaller-scale events or may be subject to significant delay.

SUMMARY

When a person in an emergency situation places an emergency call (e.g., a 9-1-1-call), it is routed to a Public Safety Answering Point (PSAP) and is answered by an emergency response agent who may coordinate responses to the emergency and operate as a telecommunicator. To assist them with emergency response, emergency response agents use emergency software, such as emergency call-taking and computer-aided dispatch (CAD) applications, which provide information about emergency calls and first responders (e.g., police, fire, and medical responders) to the telecommunicators. CAD applications enable telecommunicators to connect to first responders (e.g., police, fire, and/or emergency medical services (EMS)) and dispatch first responders to the locations of emergencies. Additional emergency software, such as emergency mapping software that provides emergency location data and/or other supplemental information relevant to emergency response in a map-based interface, can assist telecommunicators. This various software may be included in an emergency response management system.

To further coordinate emergency response, additional tools may be integrated into emergency software to generate network priority requests to modify priority of communication networks for emergency responders of the emergency. Such emergency responders may also be referred to as public safety users. Data regarding the public safety users to be assigned network priority is communicated from the emergency software to the communications (e.g., cellular) network, such that the access points receiving communications from these devices may prioritize communications of the public safety users during the emergency. In various embodiments, the emergency response software coordinates network priority to the specified public safety users on the communications network. In some embodiments, the emergency software automatically generates a priority request for public safety users based on the received data regarding an incident, e.g., the incident location and the incident type. In other embodiments, the emergency software provides a user interface to the telecommunicator with which the telecommunicator can create a priority request that is transmitted to the cellular network. After the event that prompted the priority request (e.g., an emergency dispatch event), the users may be returned to their normal priority level on the communications network.

In some embodiments, the emergency software receives data describing the locations of various emergency responders, e.g., the locations of fire, police, and/or EMS units. The emergency software may also receive or store data describing such units, e.g., unit types, unit capabilities, particular responders assigned to each unit, etc. In such embodiments, the emergency software may select certain units and/or responders for priority and transmit a request to the cellular network identifying the selected units and/or responders.

As such, communications prioritization for devices of emergency response personnel may be automatically adjusted to respond to the event. Such prioritization may be coordinated according to the particular type of emergency or identify response personnel. In addition, the prioritization may be applied to certain geographical areas, e.g., within a geofence, such that device prioritization is responsive to the event and may be time, user, and location-limited. These approaches may be particularly useful for emergency responders who do not normally receive high priority in the communications network, e.g., back-up or specialized emergency response for a particular type of event. This enables such users to receive communications priority in the emergency and may be automatically coordinated by the emergency response management system.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The figures and the following description relate to various embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
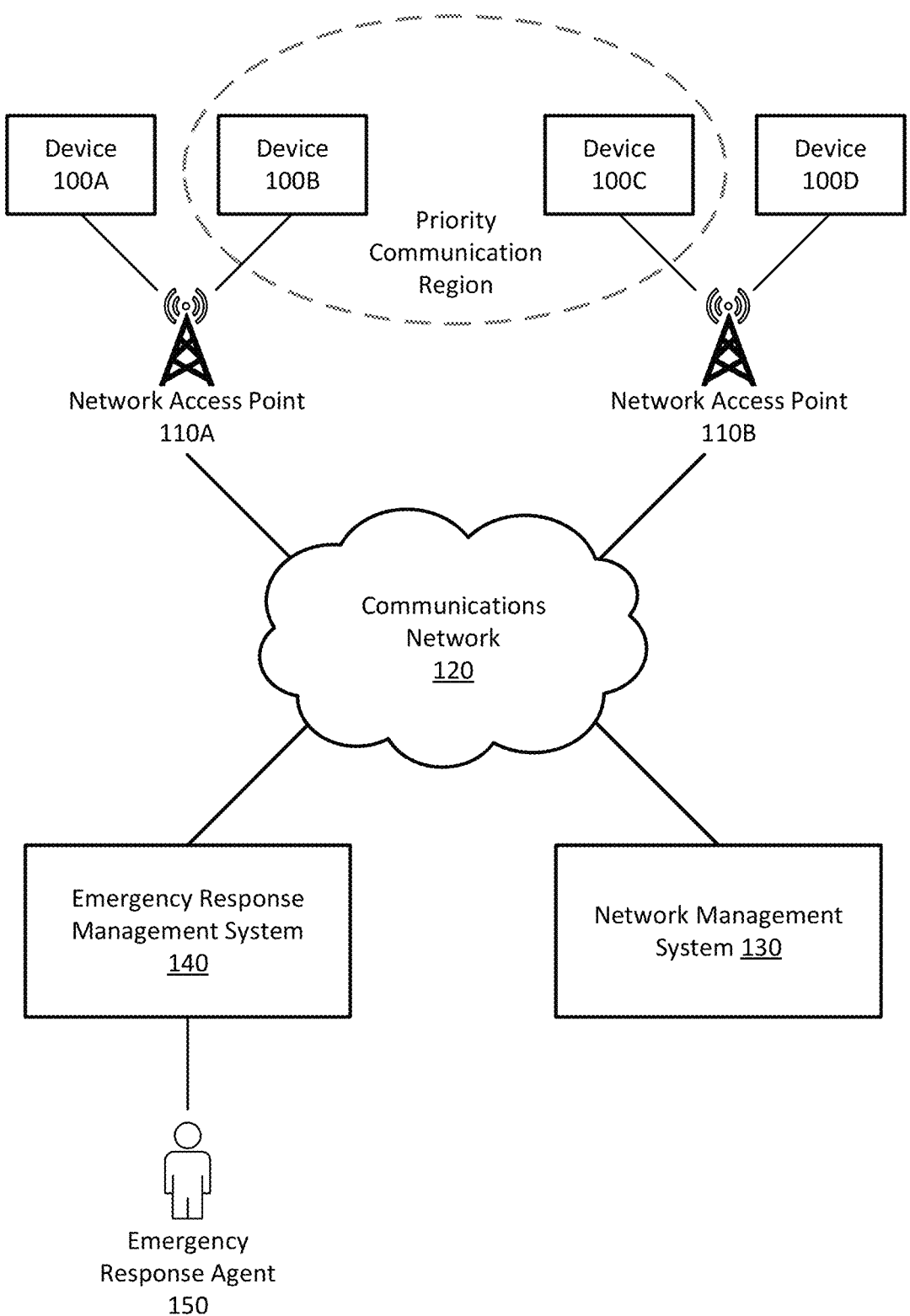
FIG. 1 shows an example environment for applying prioritized communications access for emergency response, according to one embodiment.

FIG. 1 shows an example environment for applying prioritized communications access for emergency response, according to one embodiment. The environment of FIG. 1 shows an example environment in which an emergency response management response system 140 may coordinate an emergency response with modified communications priority for devices 100 that may be operated by emergency responders (e.g., emergency personnel). To receive information about the emergency, coordinate a response, obtain data related to the emergency, and so forth, emergency responders may access information via the devices 100 that use communications network 120 to send and receive messages and other data, such as electronic data routed based on an IP (Internet Protocol) address or voice data routed based on a telephone number (e.g., via a cellular network and/or IP-routed voice data via Voice over IP (VoIP)). The devices 100 may access the communications network 120 with a variety of different types of network access points 110 that may use any suitable communication technology. Such technologies may use different protocols and/or wavelengths for transmitting and receiving signals. The network access points 110 route messages to/from the respective devices and the communications network 120.

During periods of particularly high activity, the communications network 120, including network access points 110, may have too many messages (e.g., packets) than may be processed at a given time. In many cases, access to the communications network 120 may be prioritized, both within the communications network 120 or at the network edge (e.g., at network access points 120) according to a priority level of the communicating devices and systems. When there are bandwidth constraints on the network (e.g., requested messaging exceeds available capacity), the level of service provided to the devices may be modified according to the priority level. For example, a relatively lower-priority level may have its messages discarded by the network to ensure delivery of messages from relatively higher-priority messages. The particular number of priority levels and the specific adjustments to communications processing performed by the communications network 120 to provide different service for different priority levels may differ in various embodiments. As one example, the communications network may provide three priority levels that may be designated 1-3 or respectively low, medium, and high priority levels. When communications traffic exceeds available resources (e.g., network bandwidth), the lower-priority level communications may be discarded, the medium-priority level communications may be bandwidth-limited (permitting communications with a limited volume or speed), and the higher-priority level communications may be processed normally. The priority levels may be more granular, e.g., including five, seven, or more priority levels. In one embodiment, when requested traffic on the communications network 120 exceeds available resources, communications requests may be accepted and processed based on the priority levels, such that the highest priority level is processed, and additional priority levels (in decreasing priority) are processed and accepted until the network resources are exceeded, after which, lower-priority levels are not provided service. For example, in a congested network having seven priority levels, priority levels seven, six, and five may be processed before reaching the resource capacity of the network, such that levels four through one may suffer degraded or loss of service. The monitoring and configuration of the communications network 120 and its components, such as the network access points 110, may be provided by a network management system 130, which may monitor system resource usage, and in some embodiments may apply priority level configurations to these components.

When an emergency event occurs or another situation that requires communication and coordination among emergency responders, it is also common for the level of network traffic to significantly increase, increasing the likelihood that communications for the devices 100 of emergency responders may be affected by the additional load. In some embodiments, certain emergency responders may have a relatively high priority level at all times, which may include police officers or fire fighters.

However, for many types of emergencies, members of the general public or other users who do not normally have a relatively high priority level may assist in responding to emergencies. For example, if an event involves a school, the emergency response management system 140 may give school personnel (e.g., teachers, bus drivers) temporary network priority on the communications network 120. As another example, during a mass-health event, the emergency response management system 140 may coordinate elevated cellular network usage and may give hospital personnel priority on the communications network 120.

As such, the emergency response management system 140 may have different groups of public safety users, e.g., a first group of emergency responders and other users that can receive priority in any situation, and a second or "extended" group of public safety users that can be temporarily elevated for certain events. As discussed further below, the emergency response management system 140 may identify an emergency dispatch event indicating a likely heightened need for an extended group of users (whose devices 100 under normal conditions may not typically have a relatively higher-priority level) to receive an elevated or "uplifted" priority level relative to the priority level of the users during normal network operations. The emergency response management system 140 may receive an indication of the event along with a location of the event. The emergency response management system 140 identifies a set of identifiers for the devices to receive the elevated priority level along with a priority communication region in which the elevated priority level is to be applied to the devices. The emergency response management system 140 may then coordinate with the network management system 130 to configure the communications network 120 and associated network access points 110 to provide the elevated priority level.

In the example of FIG. 1, a set of devices 100A-D connects to the communications network 120 via network access points 110A-B. In this example, a priority communication region is identified in which devices associated with identified emergency response users receive an elevated priority level. In this example, devices 100B, 100D are associated with users who are eligible to receive elevated priority when they are within the priority communication region. In the example of FIG. 1, device 100B is currently within the priority communication region and the network access point 110A, to which the device 100B is currently communicating, would provide the elevated priority level to device 100B. Device 100D, however, is not currently within the priority communication region. If the device 100D moves to within the priority communication region (or the priority communication region expands to include device 100D), then device 100D may then be provided an elevated priority level.

The emergency response management system 140 determines the emergency event, priority communication region, and associated identifiers for devices to have elevated priority and coordinates with the network management system 130 to modify the appropriate priority level of the devices—to increase the priority for devices when the emergency event occurs for identified devices within the priority communication region, and to decrease the priority to normal levels for devices outside of these conditions. In one embodiment, the emergency response management system 140 is operated in conjunction with an emergency response agent 150. For example, in many configurations, the emergency response management system 140 may include components for coordinating emergency response and dispatch of emergency personnel to a location of the emergency. As such, the emergency response management system 140 may provide a Public Service Answering Point (PSAP), such that the emergency response agent 150 may be an operator receiving calls and other communication from emergency channels such as an emergency telephone number (e.g., 9-1-1). The systems and software of the emergency response management system 140 may assist in locating the position of an emergency, such as the location of a caller to the emergency telephone number, along with mapping and computer-aided dispatch (CAD) software to determine the location of various emergency personnel and coordination of the response to the emergency. Though these and other additional services are not shown in FIGS. 1-2, the features of the emergency response management system 140 in elevating priority levels for emergency response personnel may form a portion of such PSAP and CAD systems.

As one example use case, an emergency call may be received by the PSAP systems and answered by the emergency response agent 150. The emergency response agent 150 may verify that an emergency exists and may identify the type of emergency (e.g., a significant fire at an entertainment venue). The location of the emergency may be automatically determined (e.g., input by the emergency response agent 150 manually or automatically determined based on the location of the caller) and used to determine a relevant priority communication region around the location of the emergency, which may include, for example, a geofence around the communication region. Emergency responders may be identified and dispatched to the emergency. Such responders may include, for example, part-time volunteer fire fighters who normally do not have a high priority level for the communications network 120. A list of identifiers for the devices of these responders is identified and used to adjust priority levels of the responders when they enter the priority communication region.

Thus, in one embodiment, an incident is created in an emergency mapping or dispatch software (generally, emergency software). The emergency software automatically generates a request to assign priority to relevant public safety users (e.g., first responders and/or other public safety users).

An administrator of the emergency software, such as the emergency response agent 150, can select criteria for the emergency software to automatically generate a priority request. Criteria may include incident types, call types, call nature or chief complaint of the caller, priority of call, etc. The emergency software may determine the priority communication region in various shapes, such as a polygon that includes a range of locations around the incident (e.g., a circular perimeter 1,000 yards from the incident location) and provide the polygon to the communications network 120 and/or network management system 130. As devices move in the network, the device locations are monitored and used to automatically adjust the priority level of the devices when an eligible device crosses into the polygon (e.g., within the edge of the 1,000-yard perimeter).

Figure 2:
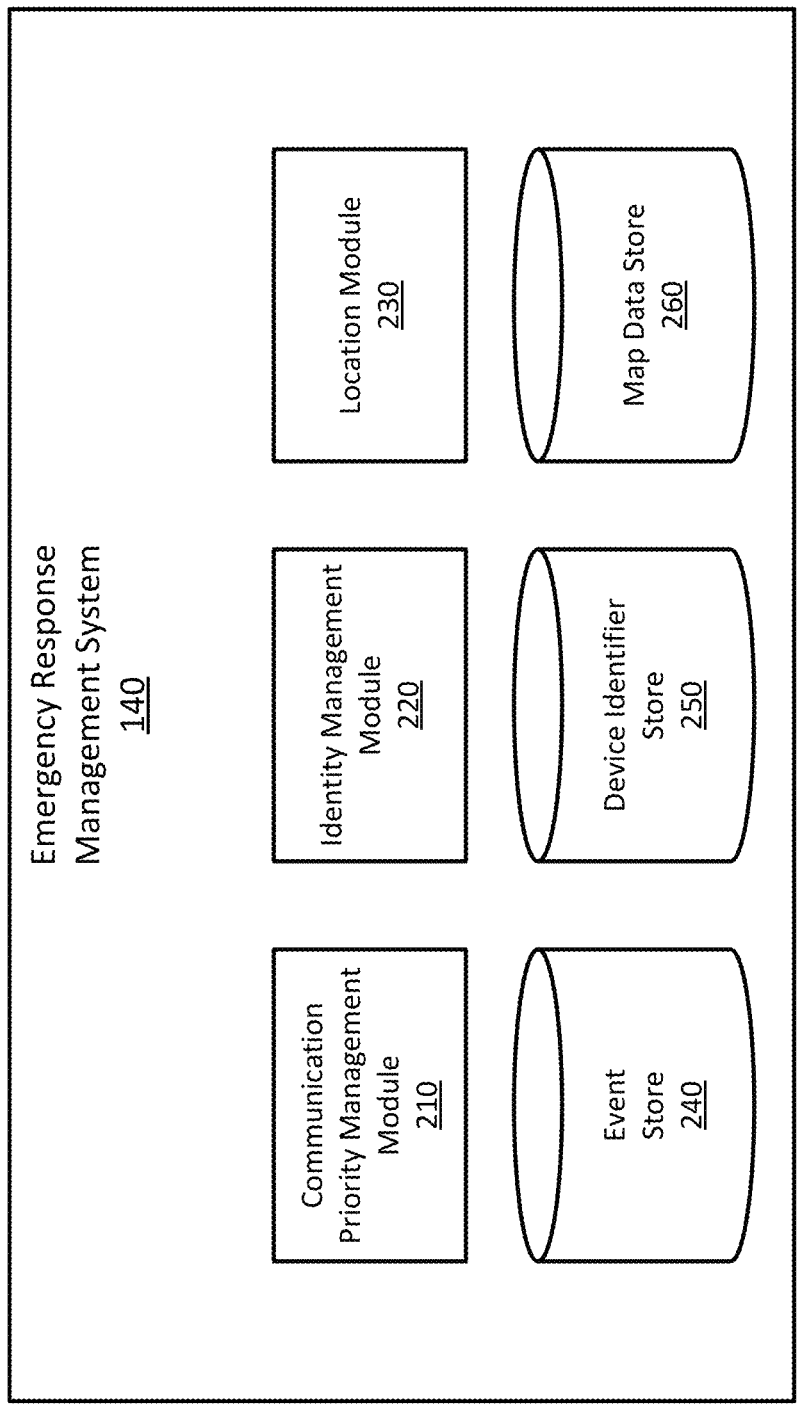
FIG. 2 provides example components for the emergency response management system, according to one embodiment.

FIG. 2 provides example components for the emergency response management system, according to one embodiment. As shown in FIG. 2, the emergency response management system 140 may include various computing modules and data stores for coordinating the priority access for emergency responders. In particular, as discussed above, the prioritization of communications may be applied to device (s) to elevate or "uplift" the communications priority level temporarily during the event. In particular, the emergency response management system 140 may include a communication priority management module 210 that coordinates management of an emergency dispatch event, an identity management module 220 that manages users and associated devices, and a location module 230 that may monitor device movement. The emergency response management system 140 also includes corresponding data stores that may maintain related data for the priority. These data stores may include an event store 240 that maintains information about emergency dispatch events, a device identifier store 250 that maintains information about users and associated identifiers and/or devices, and a map data store 260.

In general, when an emergency dispatch event is received by the emergency response management system 140, the communication priority management module 210 automatically identifies a priority communication region based on a location of the emergency dispatch event and identifiers of devices to be prioritized in responding to the event. The emergency dispatch event may be received from a message from another emergency response system, such as an external PSAP, or may be identified by an operator of such software as a component (not shown) of the emergency response management system 140. The communication priority management module 210 may also generate interfaces and provide information and receive selections and other inputs from an operator to modify the priority communication region and/or particular users/identifiers to receive prioritized communications. Example interfaces for these processes are further discussed with respect to the subsequent Figures.

The identity management module 220 and location module 230 may generate and provide information related to emergency responders to be provided elevated priority and location information about the environment and respective device(s) position within the environment. The identity management module 220 may manage information about emergency responders and identifiers that may be used to identify devices of the emergency personnel in the communications network. Such identifiers may vary according to the particular implementation, and may include, for example, a phone number, a device identifier or name, or an identifier of hardware installed on the user's device (e.g., particular chips that may be installed permanently or removably). When a particular user is selected for response to an event, the identifier may thus be used to identify the particular device(s) associated with the user and implement the increased priority level by the communications network, which may only be able to identify relevant devices based on the identifier.

Users who may respond to an event may include many different types of persons, such as school personnel, tow or other machinery operators, police, fire, safety personnel of an organization, and so forth. The identity management module 220 may also receive and manage additional information about such users and store it in the device identifier store 250 that may be used to automatically identify users that should be prioritized, which may be based on the type of or location of the emergency event. Such information may be provided by such users or may be provided by an external data source in conjunction with those users (e.g., an organization that may be associated with employees or other personnel) who may provide emergency-related services and may collect and provide such information to the emergency response management system. Such additional information may also include particular locations for which a user may assist (e.g., a building manager may be associated with emergency events affecting that particular building). Likewise, users (e.g., potential emergency responders for a particular emergency event) may be associated with particular types of emergencies, for which they may be dispatched (e.g., a part-time volunteer fire fighter may be associated with responding to certain types of fire emergencies). In addition to stored information (e.g., at device identifier store 250), information about relevant emergency responders may also be retrieved from external data sources for managing communication network priority, for example, when an external system provides PSAP and/or CAD services. As such, the data about various emergency and non-emergency personnel in some embodiments may be used to automatically identify which personnel should be prioritized for a particular event and the corresponding identifiers for devices of that personnel on the communications network.

Similarly, the location module 230 may interface with a map data store 260 to provide mapping and location information to the communication priority management module 210 for determining and coordinating location information. As a component of a dispatch management system, the location module 230 may monitor and track the location of various emergency personnel who may be dispatched to respond to an emergency. The devices operated by these users may provide location information to the location module 230 for tracking device location, such that emergency dispatch and response agents may use real-time data about location in coordinating emergency response. Some such users may not have prioritized (or a relatively high) communications with the communications network. For example, ancillary services (such as heavier trucks or machinery that may be used to assist with emergencies and other non-emergency purposes) may be registered as available to respond to particular emergencies, but typically have non-prioritized communications when operating outside of emergency event responses. For these users and for others who may be registered as available for emergency response (e.g., in device identifier store 250), devices may provide location information to the emergency response management system 140. The location module 230 may thus provide information to the communication priority management module 210 (and other components of an emergency response system, as applicable), for determining the location of such devices. In addition, the location module 230 may also monitor the position of such devices with respect to the location of the emergency and/or the priority communication region for the emergency. In some embodiments, the location module 230 may monitor when device(s) enter or exit a priority communication region for an emergency event that the identifier of the device is associated with. This may be used by the communication priority management module 210 to elevate the priority level of such devices entering the priority communication region and return the priority to a normal level for devices exiting the priority communication region.

As such, the communication priority management module 210 may coordinate device prioritization for emergencies to ensure emergency personnel may continue to access communication services that may be essential to successfully navigating the emergency. The communication priority management module 210 may coordinate priority level elevation and reduction in various ways with the communications network 120 and the network management system 130. In some embodiments, the communication priority management module 210 provides identifiers for devices to receive elevated priority along with a description of the geographical coordinates of the priority communication region and/or other geographical identifying information, such that the components of the communications network 120 (e.g., network management system 130) monitors the location of any of the identifiers associated with the event and implements prioritized service when the device identifier enters the priority communication region (and lowers the prioritized service when the device identifier exits the priority communication region). In other embodiments, the logic for identifying when to apply the prioritized service associated with the emergency may be executed by the emergency response management system 140, e.g., such that the communication priority management module 210 determines, based on the priority communication region and the location of the corresponding devices for users eligible for elevated priority for the emergency, whether an elevated or normal priority level applies to the device. In this example, the communication priority management module 210 may communicate an "elevated" or "normal" priority level to the communications network for the communications network (e.g., via a network management system) to apply that priority level. After the emergency dispatch event, the communication priority management module 210 may send a message to assign the device(s) associated with the identifiers to normal priority levels for the devices.

This embodiment may be beneficial when a device's location is reported to the emergency response management system 140 and monitored by the location module 230, e.g., as part of a CAD process. Though the communications network may be the channel through which the devices communicate with the emergency response management system 140, the location data provided by the devices may be more accurate and enable higher-accuracy location tracking and management than what may be inferred by the communications network. The devices may determine respective location information based on additional and/or different means than the signals sent to/from the network access points of the communications network. For example, a device may determine its location based on a compass, signals from a satellite network (such as Global Positioning Satellites (GPS)), or based on signals from other signal emitters that may be typically associated with placements on a map. For example, when the communications network is a cellular data network, additional signals from other types of wireless access points such as WiFi or with short-range radio (e.g., BLUETOOTH™ or Radio Frequency ID (RFID)) may be captured along with the respective signal strengths, as well as device/network names or identifiers used to further localize the position of the device with respect to a mapped space. In some embodiments, the device may send such information that may be used for location determination to the emergency response management system 140 for processing of location detection. This may enable the emergency response management system 140 to accurately detect location information for dispatch and to control priority levels based on the device location information relative to the priority communication region.

As such, the communication priority management module 210 may receive an emergency dispatch event associated with a location (e.g., based on a received call to a PSAP) and may use the location to automatically implement elevated priority levels for emergency response to the emergency event. The location may be used to determine an associated priority communication region automatically, such as a circle or other shape that may be centered on or otherwise include the location associated with the emergency. The priority communication region may be formed into different types of shapes or sizes, based on a type or severity of an emergency, and may be shaped to include the location of the emergency event and extend towards emergency response personnel to more readily enable personnel to benefit from the increased priority. Similarly, depending on the location, type, and/or severity of the emergency, the communication priority management module 210 may automatically identify responders who either are or may be dispatched to aid with the emergency along with a corresponding set of identifiers for devices of these responders to receive elevated priority in the emergency. During the emergency, the devices associated with the identifiers on the communications network may be provided with elevated priority when those particular devices are located within the priority communication region, and returned to a normal priority level when the emergency ends or when the devices leave the priority communication region.

While the users and the priority communication region may be automatically identified based on information about the emergency dispatch event (e.g., the type, severity, location, etc.), in further embodiments, information about the priority level elevation and related users may be modified by an operator of the emergency response management system 140. Details regarding the emergency dispatch event and network prioritization during the event may be stored to the event store 240. As further discussed below, the event store 240 may also include upcoming events for which prioritized service may be beneficial (e.g., in which high network load and possible emergency response may be required), such as large public events (e.g., parades, public performances) or significant weather events (e.g., approaching storms or hurricanes). Additional features of embodiments of the emergency response management system 140 and example interfaces are provided next.

Figure 3A:
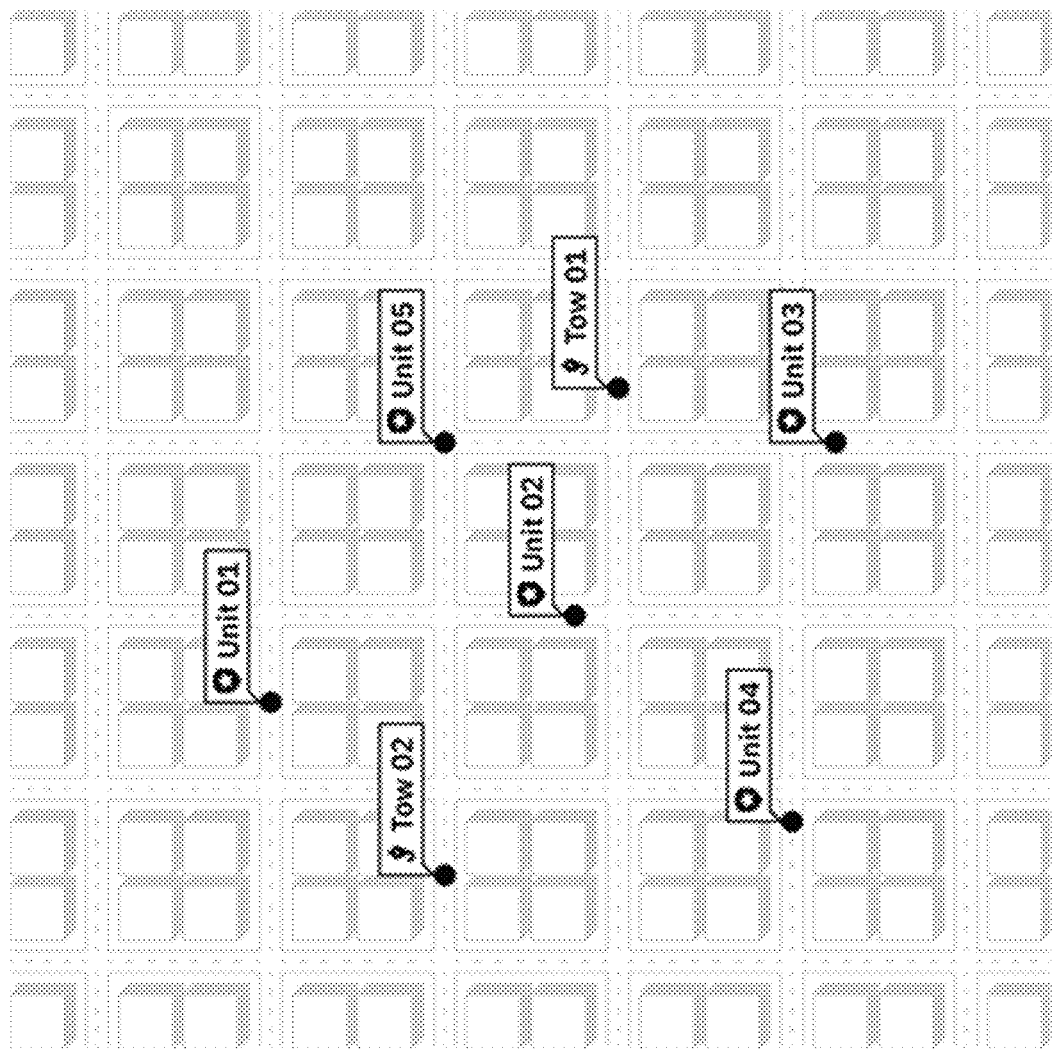
FIGS. 3A-F show example interfaces for managing priorities for communication networks for an emergency dispatch event, according to one embodiment.

FIGS. 3A-F show example interfaces for managing priorities for communication networks for an emergency dispatch event, according to one embodiment. FIG. 3A shows an interface in which a map of an area for emergency response services is displayed in an interface to an operator of the emergency response system. In this example, emergency response personnel and their associated devices may be displayed on the interface as units having positions indicating the location of the respective devices in an environment. In this example, the various emergency response "units" may represent individual police vehicles that are available for dispatch. Additional devices, such as the two tow trucks may also be indicated. These tow trucks may represent response personnel who may be provided with elevated communications priority in certain circumstances (e.g., to respond to a vehicle accident) but may typically have normal priority and may not receive elevated priority for all emergency events. As noted above, these devices may be associated with the types of emergency events for which they may be dispatched and the conditions in which they may be selected for automatic communication prioritization.

Figure 3B:
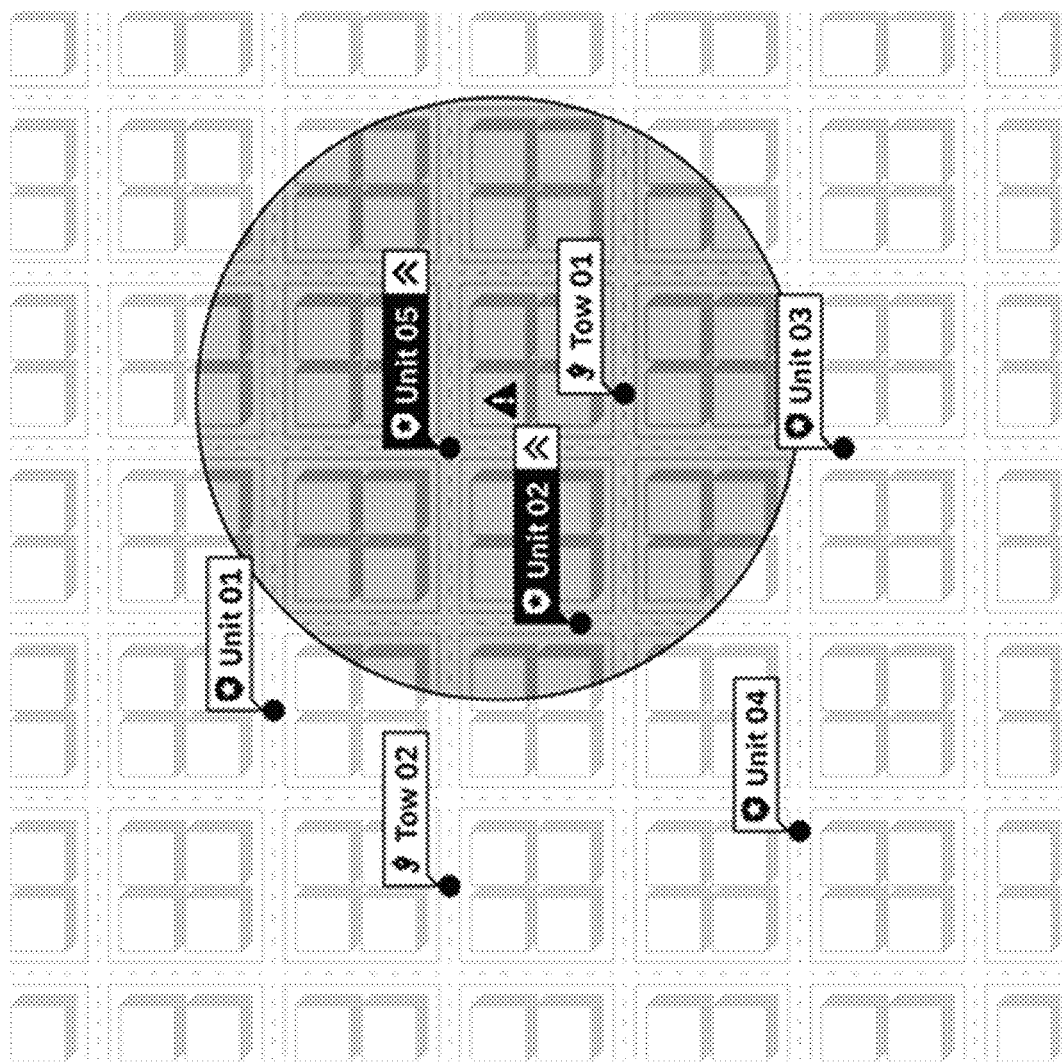

FIG. 3B illustrates the interface after the receipt of an emergency dispatch event. The emergency software may automatically determine a priority communication region that provides a perimeter for prioritizing service to emergency response; in this case, a circle indicated in FIG. 3B by the darkened area on the map. The priority communication region may be automatically determined based on the location of the emergency dispatch event; in this case, designated in FIG. 3B by a triangle with an exclamation point. In this example, the automatically generated priority communication region is a circle, e.g., 2,000 yards around the emergency dispatch event location. The emergency response units 01-05 may be identified as the emergency responders for the emergency dispatch event, and the identifiers of devices for units 01-05 are retrieved so that they may be identified and prioritized in the communications network. The emergency response management system generates and transmits a request (e.g., automatically, or in response to a creation of an emergency event by an operator) to the communications network for an increased priority level for responders in a generated priority communication region.

Figure 3C:
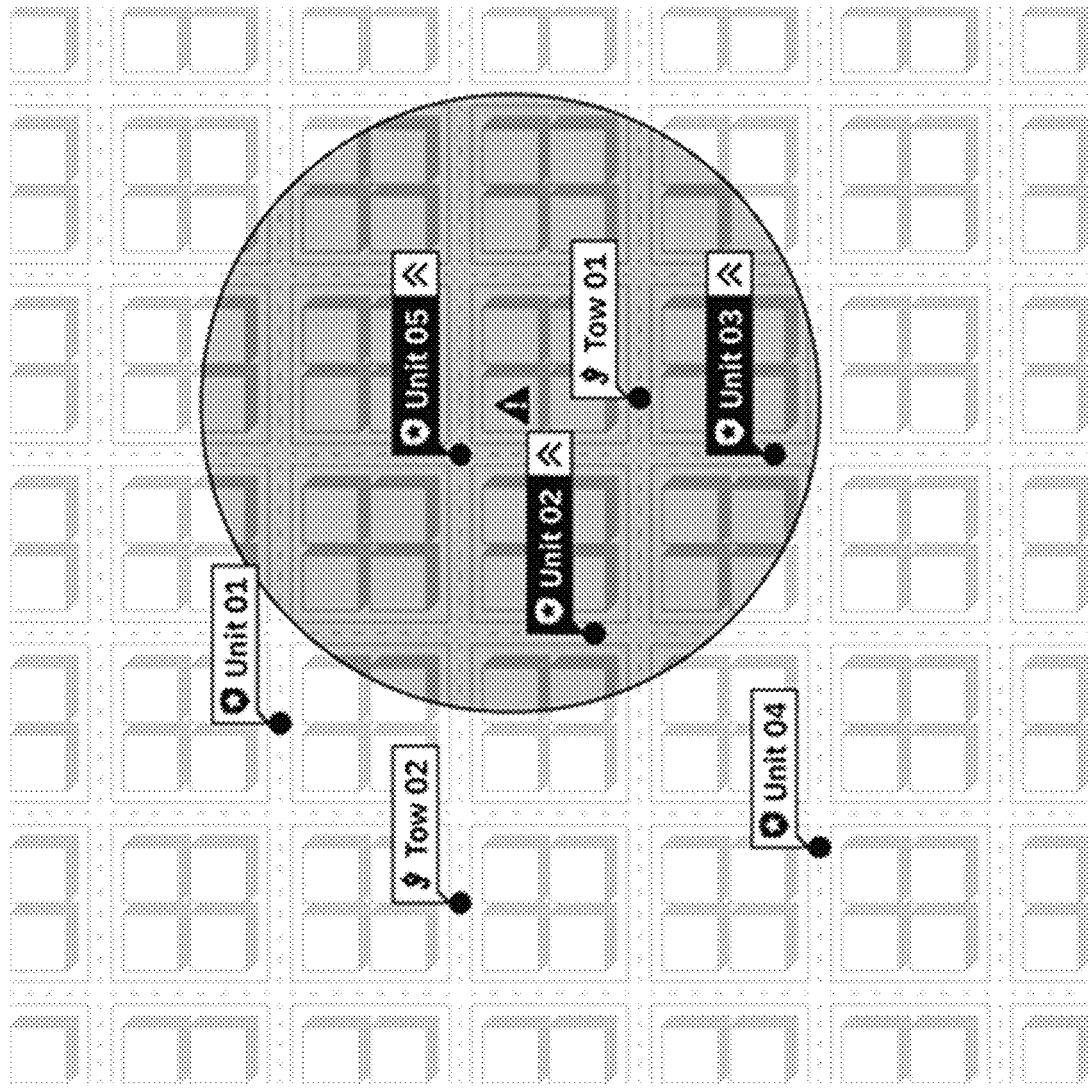

In the example shown in FIG. 3B, after comparison of the device locations to the priority communication region, Units 02 and 05 are determined to be within the priority communication region and the communications network prioritizes services for communications to and from these devices. In some embodiments, components of the communications network may be configured to perform the location comparison (e.g., in which case the prioritization request may designate the priority communication region), and in some embodiments, the location comparison may be performed by the emergency response management system 140 (e.g., in which case the prioritization request may designate to increase priority levels for Units 02 and 05 directly). As devices move in the environment, the changed positions may be updated in the interface, and when devices enter or exit the priority communication region (e.g., which may be monitored based on a perimeter or geofence of the region), the priority level of the device in the network may be increased or decreased. FIG. 3C illustrates the effect of a unit designated for prioritized access entering the priority communication region. The communications network (e.g., a cellular network) compares the location of Unit 03 to the polygon (e.g., incident perimeter) provided by the emergency software, and the cellular network automatically lifts Unit 03 to a higher priority level. In other embodiments, the location of Unit 03 and determination that it has entered the priority communication region may be performed by the emergency response management system. The identification of the priority communication region, identifiers of devices to be prioritized, and prioritization may thus all be performed automatically in some embodiments, improving response to emergencies and other incidents. In addition, the location-focused approach (e.g., the use of the priority communication region) prevents excess prioritization requests to the network and allows the network to otherwise provide normal prioritization services, thus providing emergency services where it is needed but without unduly prioritizing non-emergency services for devices that may not typically require it, thus limiting the overall network impacts of the prioritization.

Figure 3D:
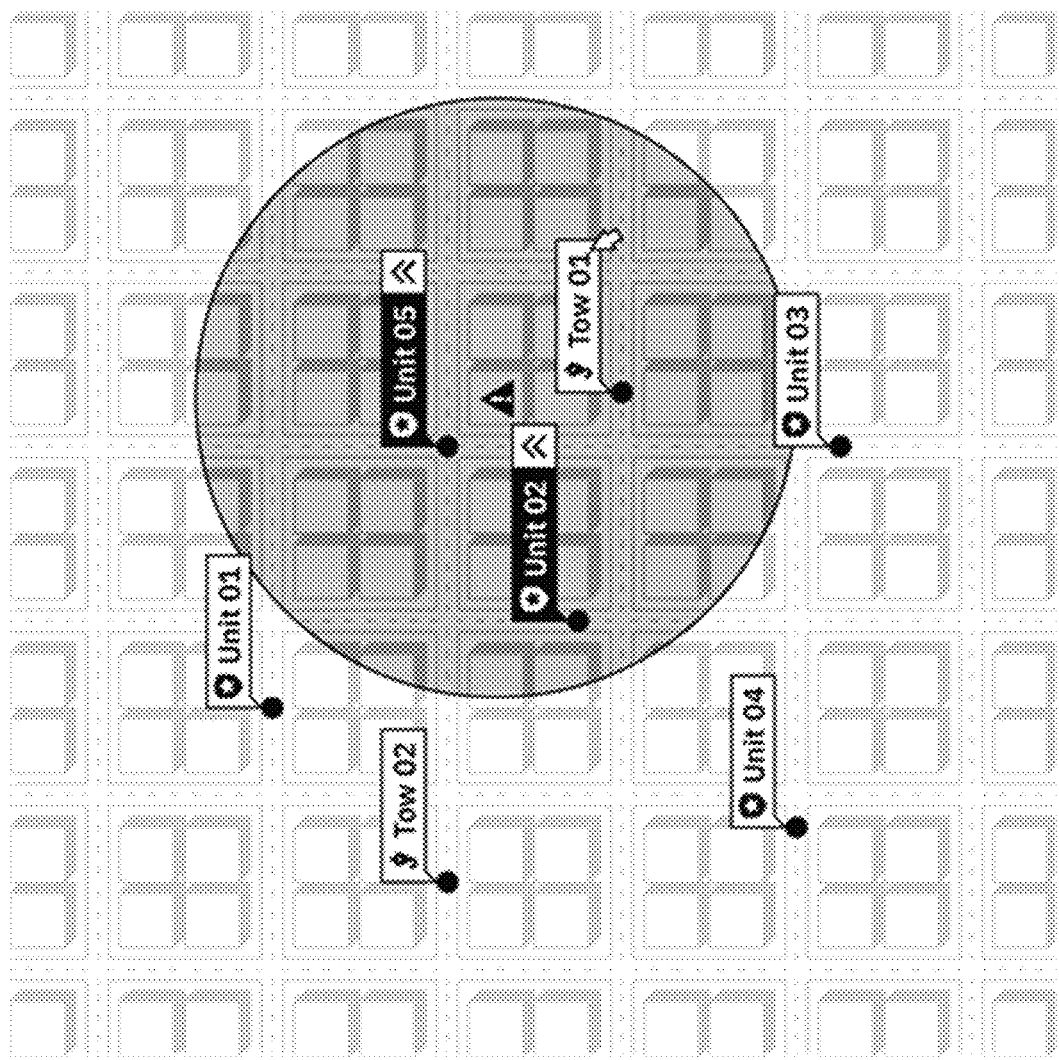
Figure 3E:
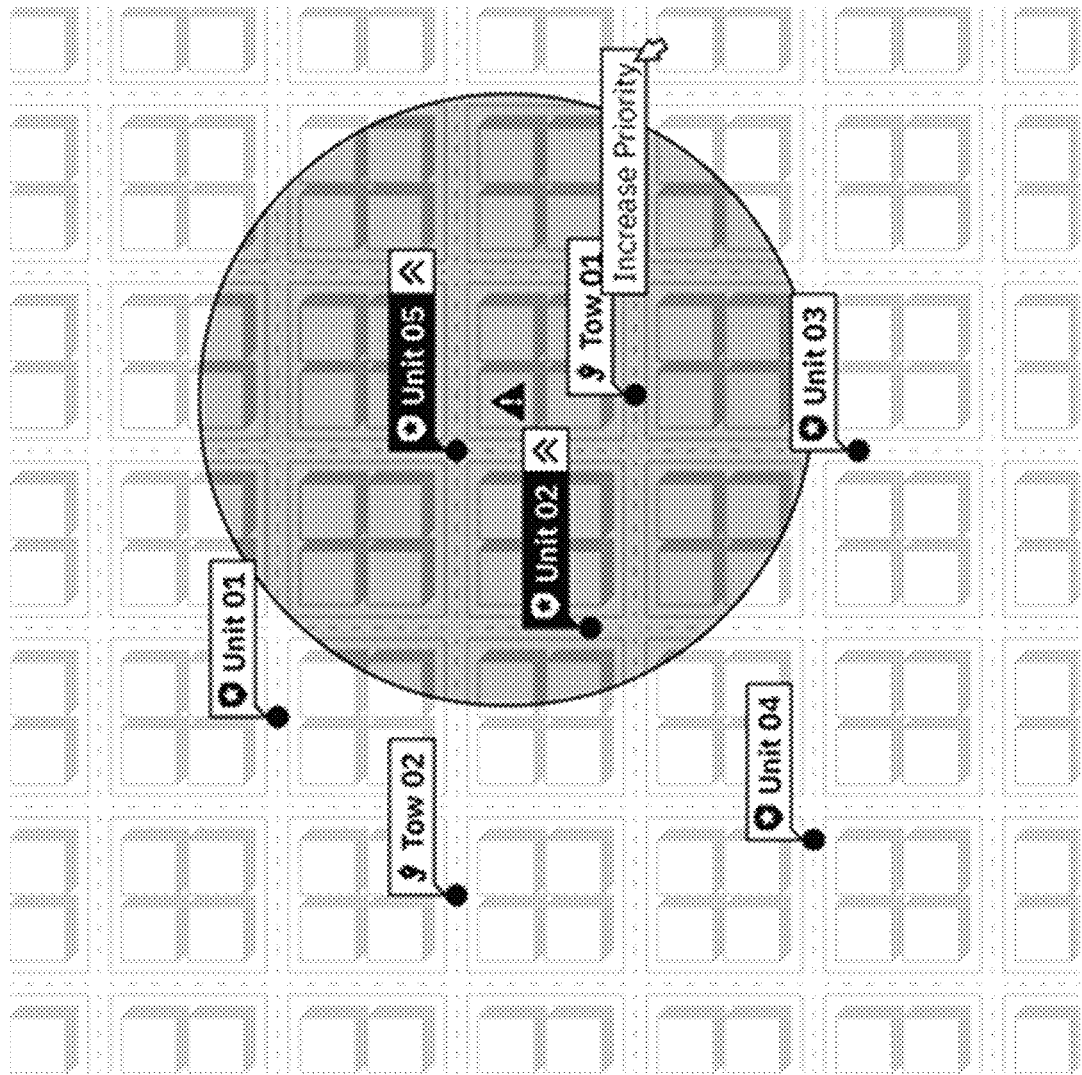
Figure 3F:
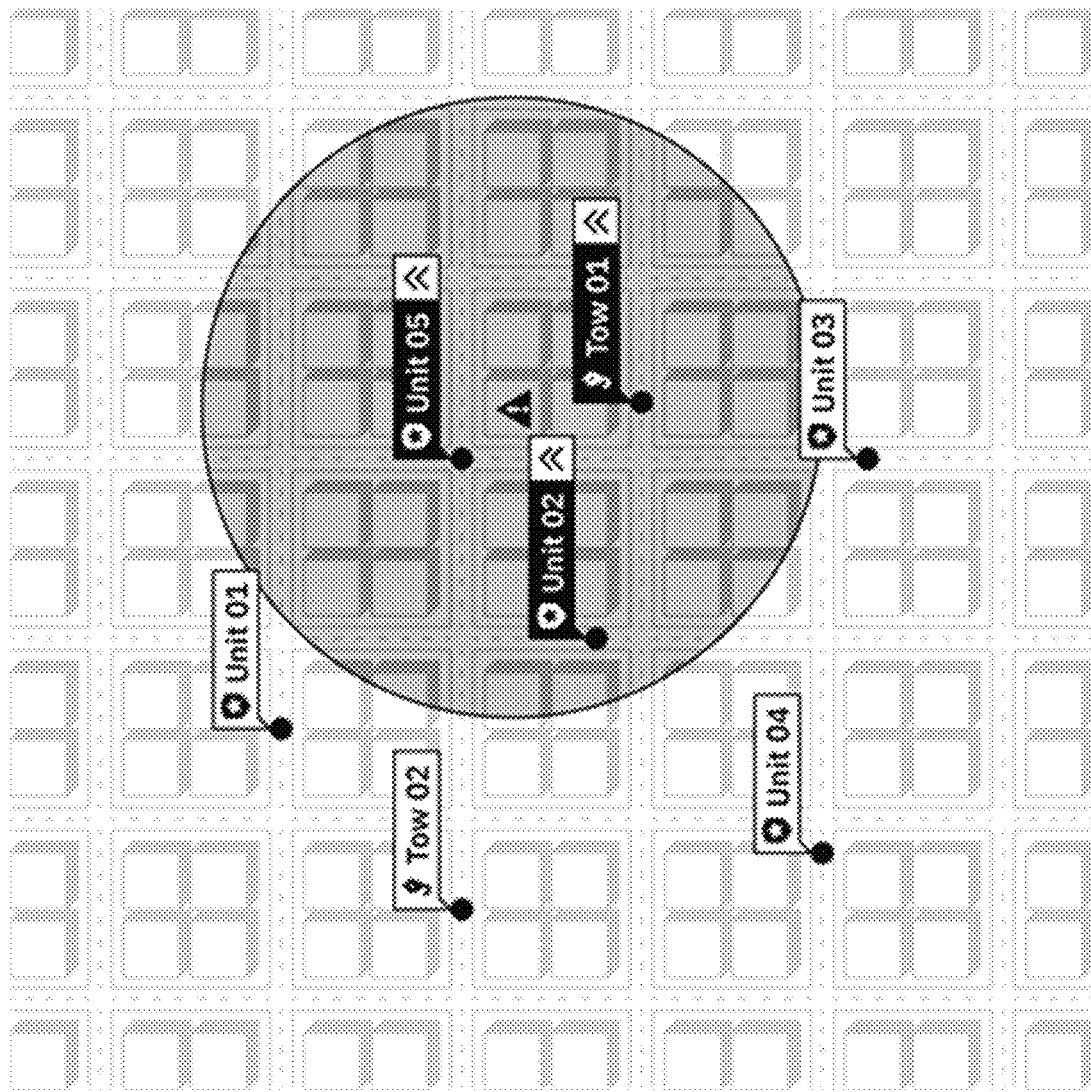

FIGS. 3D-3F show an interface for an operator to modify the inclusion of a device in the set of devices/identifiers that receive higher priority within the priority communication region. The user may select a representation of the device in the interface, in this case "Tow 01," as shown in FIG. 3D to adjust the priority. After selecting the item, such as with a click or right-click of a mouse, the user may be presented with an interface element ("Increase Priority") to prioritize the device as shown in FIG. 3E. When the user selects the prioritization interface element, the device is added to the list of prioritized devices for the event and the emergency prioritization interface. The selection of the device permits the operator to request that the device be added to the prioritized devices, allowing the operator to request that the cellular network grant network priority to the responder selectively, regardless of whether it is previously associated with the event or is normally considered an emergency responder. After prioritization, like the other devices, the interface may modify the displayed representation of the selected device to indicate the modified priority as shown in FIG. 3F, in this example changing color of the "Tow 1" label from white to black. The emergency software may receive feedback from the cellular network indicating that the cellular network has granted priority according to the prioritization request.

As such, for certain users (e.g., a PSAP manager/administrator using the emergency software, or another authorized user), the emergency software provides an interface to request priority access for a specific user/device ID (e.g., an identifier of the device on the cellular network) or a phone number of the device (which may operate as the identifier). The emergency software passes the identifying information to the cellular network to request priority for the device in the priority communication region.

Figure 4A:
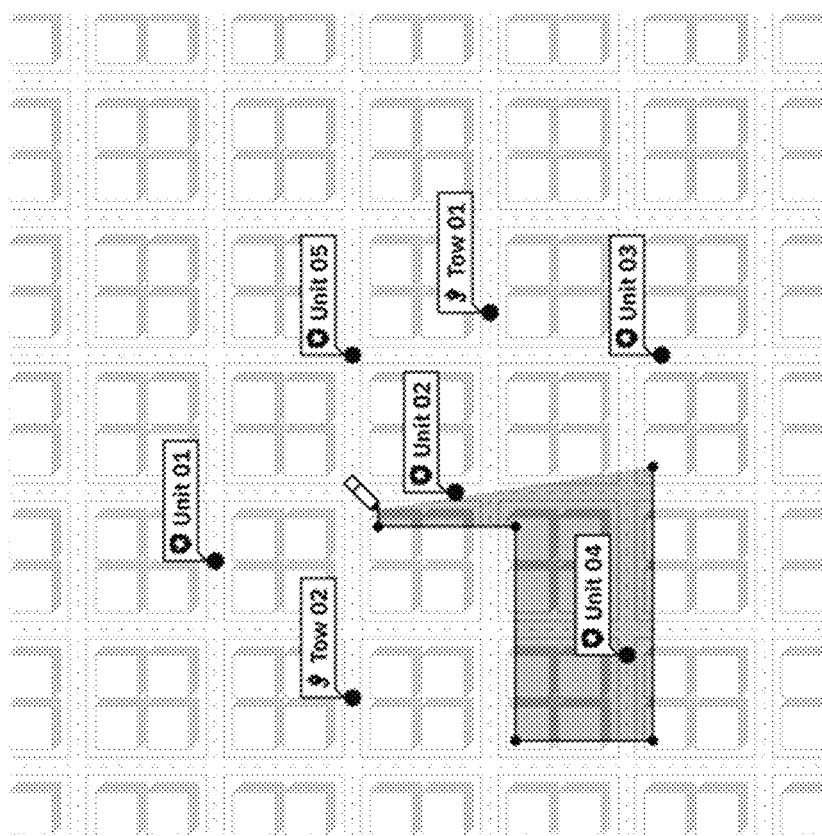
FIGS. 4A-4B show an example interface for designating the priority communication region for an emergency dispatch event, according to one embodiment.
Figure 4B:
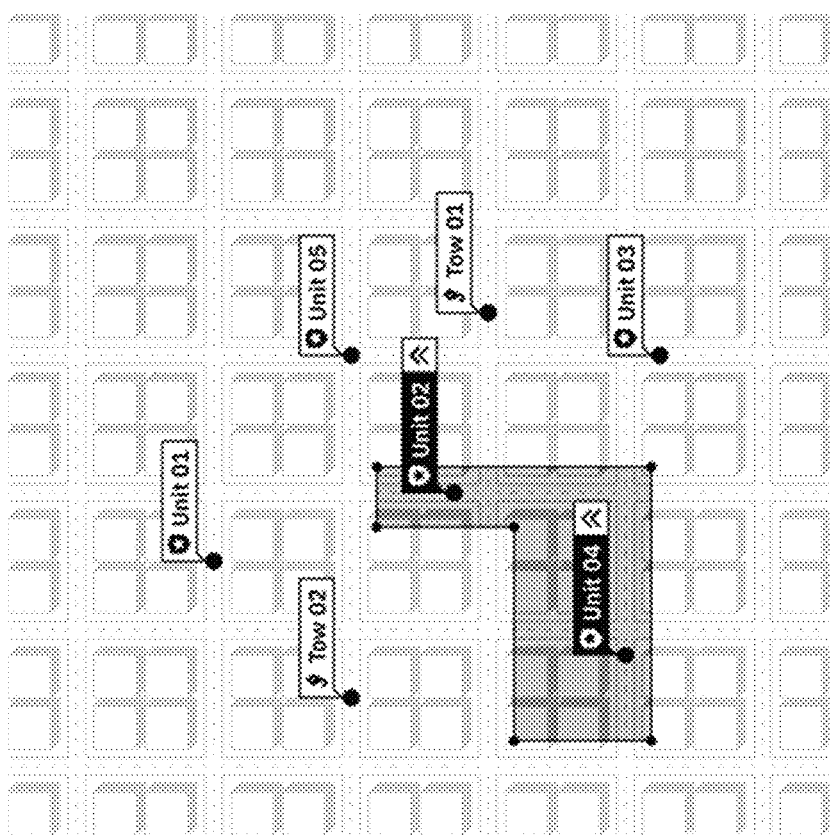

FIGS. 4A-4B show an example interface for designating the priority communication region for an emergency dispatch event. In some instances, the priority communication region that may be automatically generated may imprecisely capture the relevant areas for the particular emergency. FIG. 4A shows an interface for an operator to manually designate a region that may be used as a modified priority region for the emergency dispatch event. The region may be generated in any suitable way; in the example of FIG. 4A, the operator draws a polygon corresponding to the priority communication region on an interface displaying the drawn region. The location of displayed devices may then be compared with the priority communication region and the devices within the region may be provided increased priority. As shown in FIG. 4B, the units (e.g., having identifiers for priority access) within the designated priority communication region may then be designated with increased priority in the interface (e.g., with a distinguishable label).

As such, operators (e.g., dispatchers, or some subset of dispatchers with privileged access) can manually draw a polygon or buffer around an incident location that may automatically increase priority for emergency response within it. The emergency software transmits a request to the communications network that then increases the priority of designated responders once the units cross the perimeter of the region. As such, if a critical unit enters the priority communication region that also has a priority request, once the device's latest position is passed to the communications network and the communications network determines that the unit has entered the polygon/perimeter, the unit's priority is increased automatically. Non-critical units can manually have their priority increased as well as shown above.

FIGS. 5A-D show interfaces for selecting a portion of a structure for the priority communication region, according to one embodiment. In this example, the priority communication region may be defined as a portion of a structure or a "micro-space" of a building. In other words, in addition to coordinates defining the region as a boundary in latitude or longitude, the priority communication region may also be defined with vertical coordinates in space. Thus, operators (e.g., dispatchers, or some subset of dispatchers with privileged access) can choose to assign priority to public safety users within a certain micro-space, such as a building or a portion of a building. A micro-space may be defined, e.g., by a geographic boundary within a larger geographic boundary, and/or by a range along a z-axis (altitude). For example, for a large building footprint such as a school, the Pentagon, a hospital with multiple floors, etc., the operator may select a micro-space within the building. The defined geographical coordinates along with vertical coordinates are provided to the communications network by the emergency software.

Figure 5A:
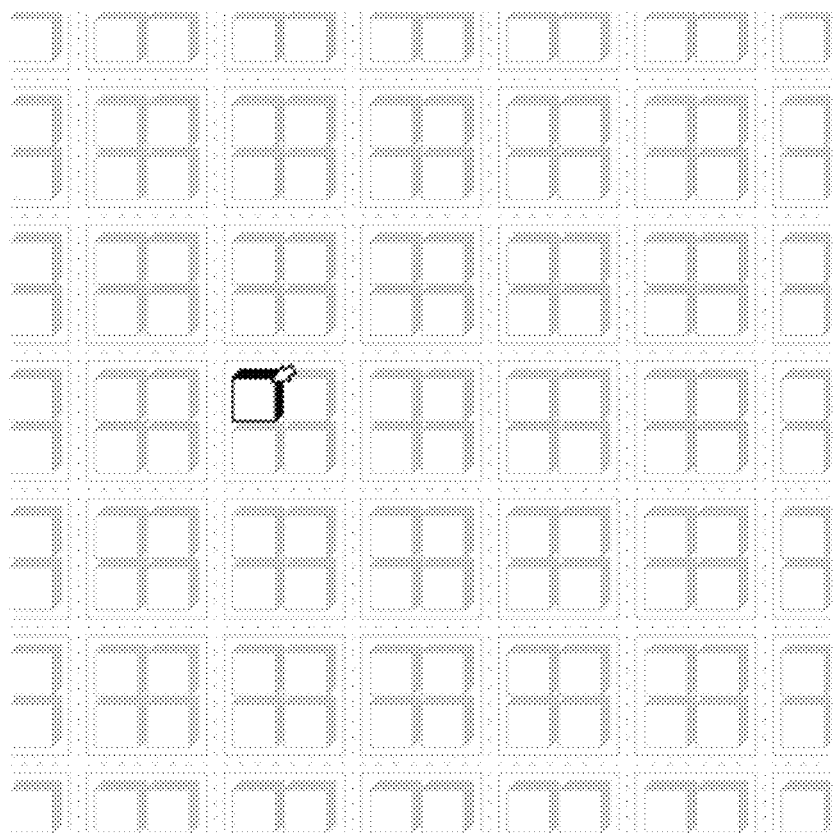
FIGS. 5A-D show interfaces for selecting a portion of a structure for the priority communication region, according to one embodiment.
Figure 5B:
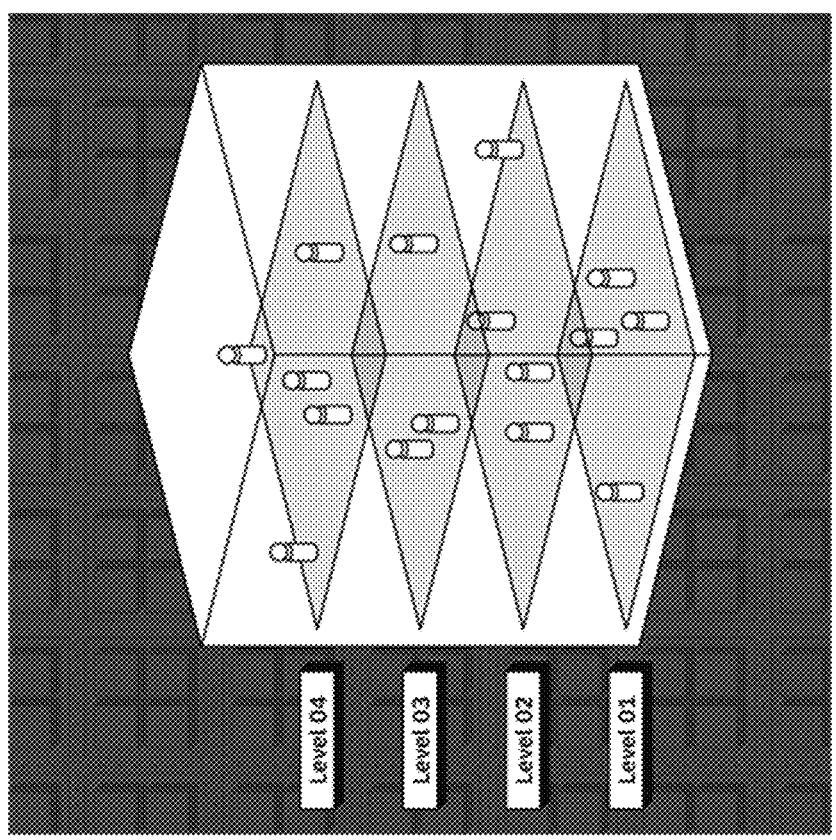

FIG. 5A shows an interface in which the operator selects a building footprint on a map. Selecting the building may yield an interface as shown in FIG. 5B showing an expanded view of the selected building. The interface presents the expanded view in FIG. 5B as a cutaway of the structure displaying the levels within the selected building. In some embodiments, location information of devices may be determined with precision along a vertical dimension and used to present the location of users in the building in the interface, along with determining whether such devices are within the priority communication region. The vertical location may be determined in various ways, and in some embodiments may include the use of beacons or tags within the building.

Figure 5C:
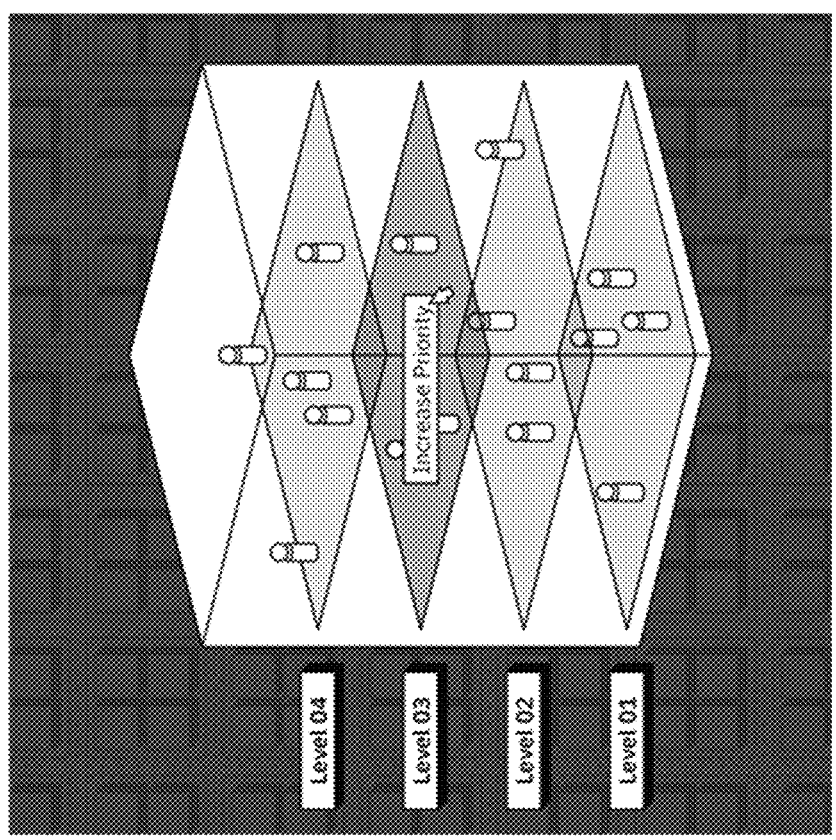

FIG. 5C shows an example interface for prioritizing coordinates along a vertical dimension, in this case for the selection of a floor or level for prioritization. In various embodiments, buildings, structures, or other spaces may be segmented into different selectable portions, which may encompass one or more floors of a building. When the operator selects a particular floor, the interface presents a prioritization element for increasing the priority of devices within the selected floor. Emergency software transmits a request to the cellular network to increase priority of devices on the selected floor. In some circumstances, such as when the selected priority communication region is relatively small, the devices within that region may represent a subset of devices that connect to a particular network access point, permitting the selection of the region to enable prioritization of all devices within the priority communication region (in this instance, the selected micro-space). In other embodiments, the devices to be prioritized are determined as discussed above.

Figure 5D:
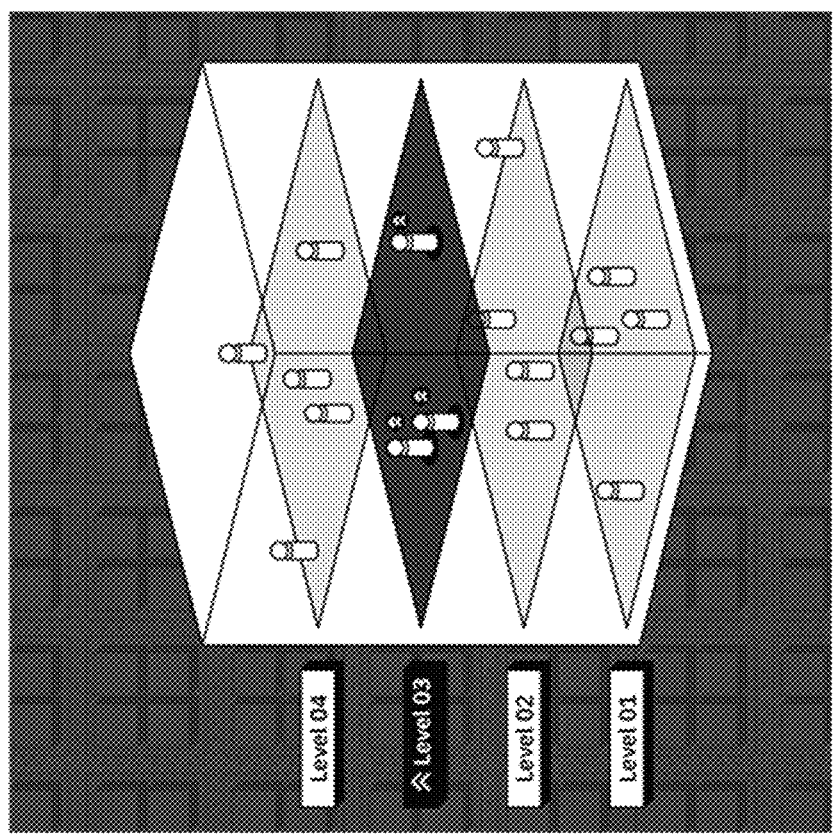

FIG. 5D illustrates that the interface may indicate the prioritization of Level 03, and that the devices within Level 03 are receiving prioritized communications access. The prioritization may be indicated with a highlight or other visual change, in FIG. 3D by adding a symbol and changing the color of Level 03 to black. In this instance, the geographic location may be used to distinguish, from the many devices accessing a network access point, which devices to prioritize according to where the device is positioned in the environment.

Figure 6:
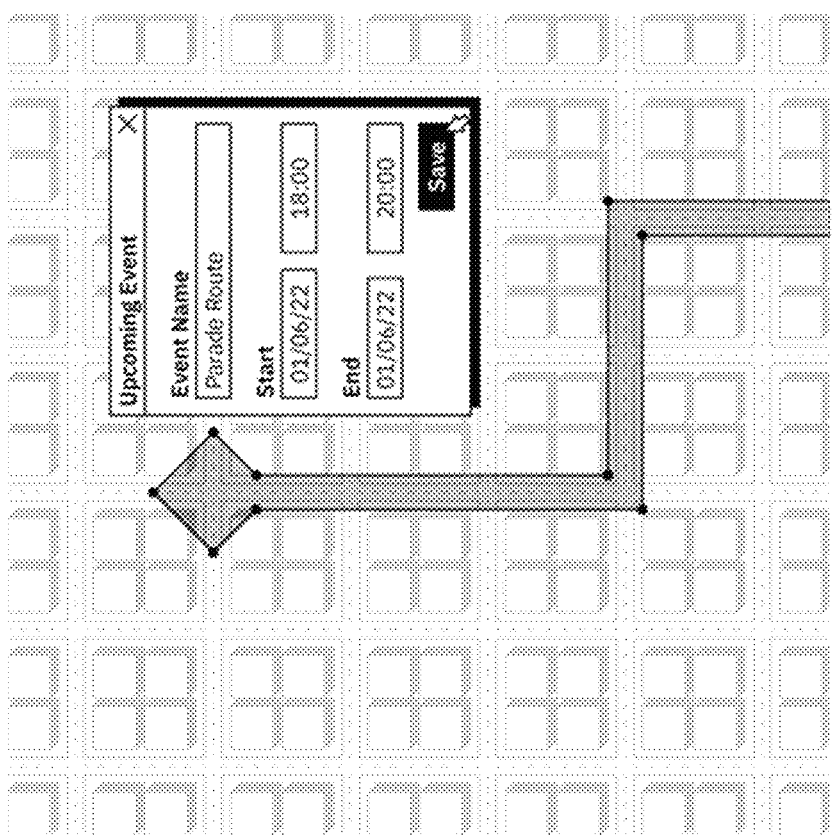
FIG. 6 shows an example interface for a planned prioritization, according to one embodiment.

FIG. 6 shows an example interface for a planned prioritization, according to one embodiment. In this example, an operator may define an upcoming event for which devices (e.g., particular devices) should be prioritized, enabling pre-emptive prioritization for the event. In this example, the region may be designated as discussed above, e.g., based on a location for the event and/or as modified drawing a polygon in the map interface. After determining the priority communication region, the operator can set a specific date/time range in which the priority region is active and save it with a recognizable name. These may be stored to the event store as shown in FIG. 2 and may become active when the start time of the event arrives.

In addition, the designated priority communication region may also be saved for re-use and may be associated with future events. The emergency software provides an interface for certain users of the emergency software to designate priority communication regions on the map that can be saved and used for future events/incidents that may require network priority for public safety users. For example, a user may create and save pre-drawn regions that can be retrieved and then quickly applied to e.g., an incoming severe weather threat, or a major event within the city (e.g., concert, rally, VIP visit, marathon, etc.). As noted above, when a particular event is scheduled, the user may set a date and time for the priority request to take effect. As another example, a user may create polygons for particular structures or areas that may benefit from a fast response, such as school/university buildings or complexes, hospital buildings or complexes, and government buildings or complexes.

Figure 7A:
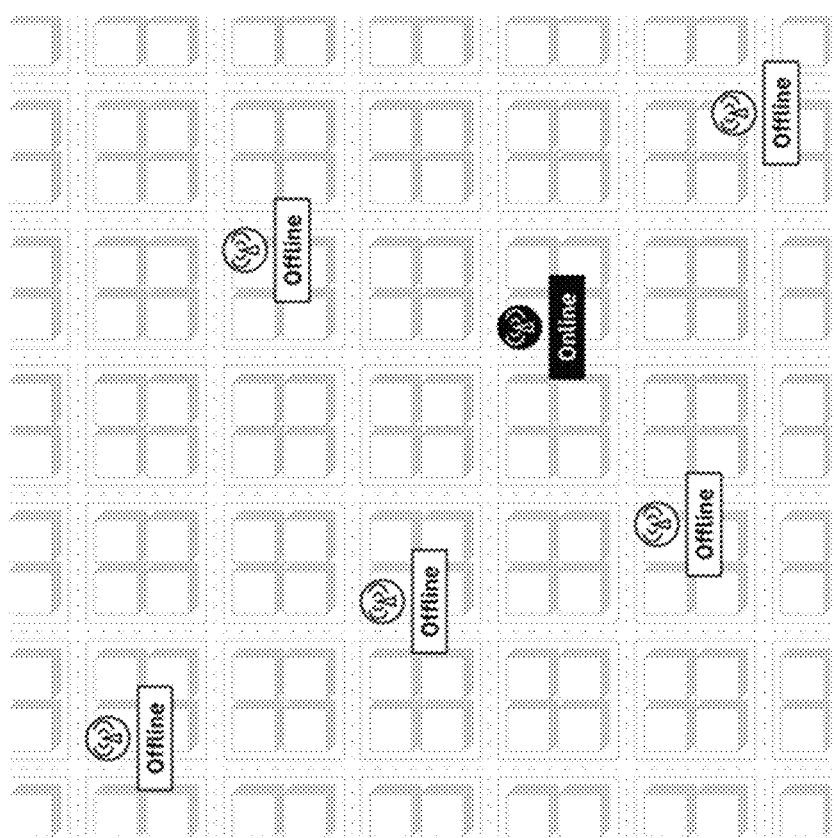
FIGS. 7A-C show an example interface for selecting a priority communication region based on a network access point, according to one embodiment.
Figure 7B:
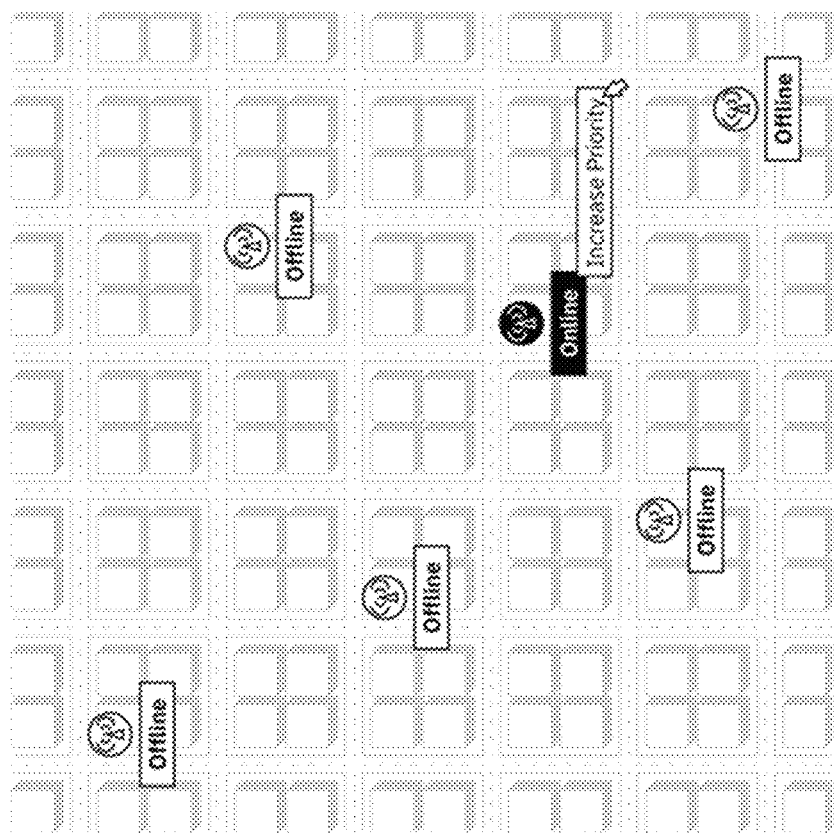
Figure 7C:
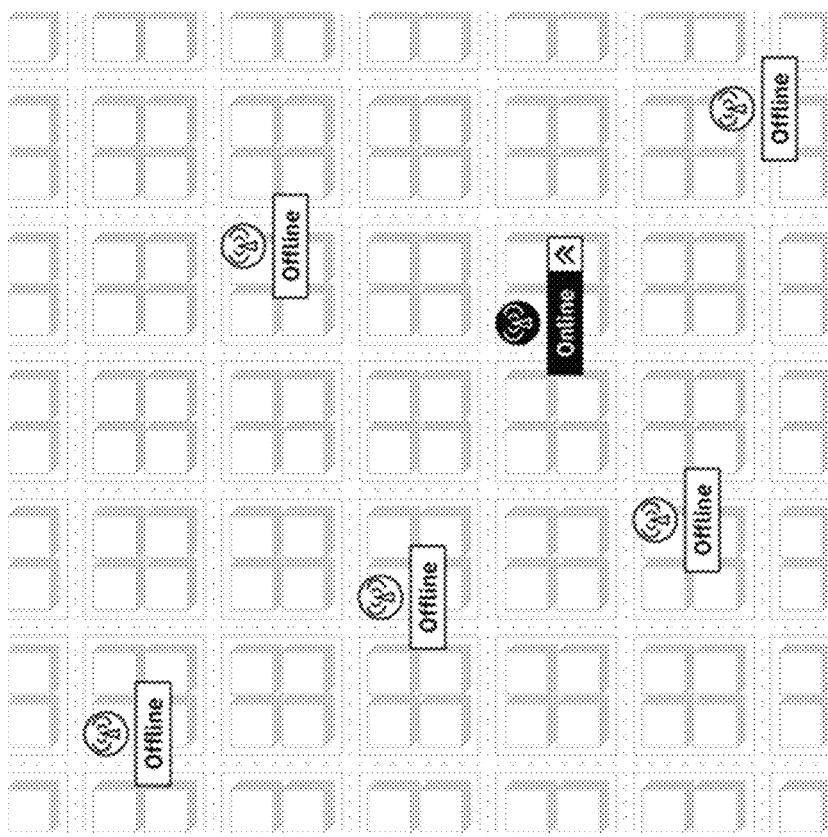

FIGS. 7A-C show an example interface for selecting a priority communication region based on a network access point, according to one embodiment. In addition to designating coordinates, the priority communication region may also be defined according to the network access point being accessed by devices. Via a map layer, the operator may view network access point locations (e.g., cellular phone towers) and may also be displayed with related statuses (e.g., which may be affected by a power outage, weather event, or network maintenance). As shown in FIG. 7A, several network access points may be shown as unavailable or "offline," while one access point is shown as "online." In this circumstance, the single online network access point may be under increased load. As such, as shown in FIGS. 7B and 7C, an operator may select an access point (here, a cellular phone tower) and designate the tower as the priority communication region, such that any of the devices of emergency responders connecting to the designated tower may be assigned higher priority. FIG. 7C shows the selected cell tower is marked as "uplifted," indicating that units (e.g., emergency response units) connecting to this cell tower are given network priority.

As such, an operator can request network priority for public safety users that are using a specific network access point. This may be particularly useful when a network access point is a cell-on-wheels (COW) that is temporarily brought to an area due to a special event and there will be a known increase in network usage across the cell towers in the area, or due to an outage due to a severe weather event, for example, and cellular communications in the area have been hampered. Being able to give priority to these users on that access point ensures that such users may maintain access to the communications network.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

While particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method comprising:
    receiving an emergency dispatch event associated with a location;
    determining a priority communication region associated with the emergency dispatch event for increased emergency response priority, wherein the priority communication region is based on the location of the emergency dispatch event;
    identifying a set of identifiers associated with a set of devices to receive increased network access priority during the emergency dispatch event;
    identifying a first device, from the set of devices, that has a first device location outside the priority communication region;
    applying a standard network access priority level for delivery of messages received from the first device, the standard network access priority applied by one or more networking devices in a communications network;
    determining that the first device has a second device location that is within the priority communication region;
    responsive to determining that the first device has the second device location within the priority communication region, modifying the network access priority level of the first device to a higher priority level; and
    prioritizing, by the one or more networking devices in the communications network, delivery of messages received from the first device, the prioritized delivery being elevated relative to messages received from a second device that is within the priority communication region, wherein, based on bandwidth constraints on the communications network and requested messaging exceeding available capacity, a level of service provided to the devices is modified according to the priority level, including selecting between different levels of network access priority for those set of devices identified as being within the priority communication region.

2. The method of claim 1, further comprising:
    providing a graphical interface displaying a regional map to an emergency response coordinator;
    receiving a selection from the emergency response coordinator designating a portion of the graphical interface; and
    determining the priority communication region based on the selection.

3. The method of claim 1, wherein the priority communication region includes vertical coordinates.

4. The method of claim 1, wherein the priority communication region is an access point for the communications network.

5. The method of claim 1, wherein the device location of at least one device of the set of devices is determined based on a location device that is not part of the communications network.

6. The method of claim 1, wherein the set of devices associated with the identifiers have the standard network access priority within the priority communication region during normal operation of the communications network.

7. The method of claim 1, wherein determining the set of identifiers comprises automatically determining the set of identifiers based on information about users associated with the set of identifiers and an emergency type.

8. The method of claim 1, wherein the second device that is within the priority communication region is not one of the set of devices to receive increased network access priority during the emergency dispatch event.

9. The method of claim 1, wherein prioritizing, by the one or more networking devices in a communications network, delivery of messages received from the first device, comprises:
    receiving the message from the first device at a network access point; and
    transmitting the message from the network access point to a communication device in the communications network based on the higher priority level.

10. A system, comprising:
    a processor; and
    a non-transitory computer-readable storage medium having instructions that are executable by the processor for:
    receiving an emergency dispatch event associated with a location;
    determining a priority communication region associated with the emergency dispatch event for increased emergency response priority, wherein the priority communication region is based on the location of the emergency dispatch event;
    identifying a set of identifiers associated with a set of devices to receive increased network access priority during the emergency dispatch event;
    identifying a first device, from the set of devices, that has a first device location outside the priority communication region;
    applying a standard network access priority level for delivery of messages received from the first device, the standard network access priority applied by one or more networking devices in a communications network;
    determining that the first device has a second device location that is within the priority communication region;
    responsive to determining that the first device has the second device location within the priority communication region, modifying the network access priority level of the first device to a higher priority level; and
    prioritizing, by the one or more networking devices in the communications network, delivery of messages received from the first device, the prioritized delivery being elevated relative to messages received from a second device that is within the priority communication region, wherein, based on bandwidth constraints on the communications network and requested messaging exceeding available capacity, a level of service provided to the devices is modified according to the priority level, including selecting between different levels of network access priority for those set of devices identified as being within the priority communication region.

11. The system of claim 10, the instructions further executable for:
providing a graphical interface displaying a regional map to an emergency response coordinator;
receiving a selection from the emergency response coordinator designating a portion of the graphical interface; and
determining the priority communication region based on the selection.

12. The system of claim 10, wherein the priority communication region includes vertical coordinates.

13. The system of claim 10, wherein the priority communication region is an access point for the communications network.

14. The system of claim 10, wherein the device location of at least one device of the set of devices is determined based on a location device that is not part of the communications network.

15. The system of claim 10, wherein the set of devices associated with the identifiers have the standard network access priority within the priority communication region during normal operation of the communications network.

16. A non-transitory computer-readable storage medium comprising instructions executable by a processor to:
receive an emergency dispatch event associated with a location;
determine a priority communication region associated with the emergency dispatch event for increased emergency response priority, wherein the priority communication region is based on the location of the emergency dispatch event;
identify a set of identifiers associated with a set of devices to receive increased network access priority during the emergency dispatch event;
identify a first device, from the set of devices, that has a first device location outside the priority communication region;
apply a standard network access priority level for delivery of messages received from the first device, the standard network access priority applied by one or more networking devices in a communications network;
determine that the first device has a second device location that is within the priority communication region;
responsive to determining that the first device has the second device location within the priority communication region, modify the network access priority level of the first device to a higher priority level; and
prioritize, by the one or more networking devices in the communications network, delivery of messages received from the first device, the prioritized delivery being elevated relative to messages received from a second device that is within the priority communication region, wherein, based on bandwidth constraints on the communications network and requested messaging exceeding available capacity, a level of service provided to the devices is modified according to the priority level, including selecting between different levels of network access priority for those set of devices identified as being within the priority communication region.

17. The non-transitory computer-readable storage medium storage of claim 16, the instructions further comprising:
providing a graphical interface displaying a regional map to an emergency response coordinator;
receiving a selection from the emergency response coordinator designating a portion of the graphical interface; and
determining the priority communication region based on the selection.

18. The non-transitory computer-readable storage medium storage of claim 16, wherein the priority communication region includes vertical coordinates.

19. The non-transitory computer-readable storage medium storage of claim 16, wherein the priority communication region is an access point for the communications network.

20. The non-transitory computer-readable storage medium storage of claim 16, wherein the device location of at least one device of the set of devices is determined based on a location device that is not part of the communications network.

* * * * *